United States Patent [19]

Czerwin

[11] 4,094,718

[45] June 13, 1978

[54] PROCESS OF PREPARING CORRUGATED PAPER BOARD WITH A PARTICULAR POLYVINYL ALCOHOL MODIFIED STARCH-BASED CORRUGATING ADHESIVE

[75] Inventor: Edward Peter Czerwin, Wilmington, Del.

[73] Assignee: E. I. Du Pont de Nemours and Company, Wilmington, Del.

[21] Appl. No.: 632,725

[22] Filed: Nov. 17, 1975

[51] Int. Cl.² .......................... B31F 1/20; C08L 3/02
[52] U.S. Cl. .................................. 156/210; 156/328; 260/9; 260/17.2; 260/17.3; 260/17.4 ST
[58] Field of Search ............. 260/17.4 ST, 17.2, 17.3, 260/9; 156/210, 328

[56] References Cited

U.S. PATENT DOCUMENTS

| | | | |
|---|---|---|---|
| 2,051,025 | 8/1936 | Bauer | 156/208 |
| 2,102,937 | 12/1937 | Bauer | 106/213 |
| 3,133,890 | 5/1964 | Britton | 260/17.4 |
| 3,247,040 | 4/1966 | Fine et al. | 156/210 |
| 3,498,869 | 3/1970 | Murakami et al. | 260/29.6 B |
| 3,654,247 | 4/1972 | Bristol | 526/11 |
| 3,767,604 | 10/1973 | Hjermstad et al. | 260/17.4 |
| 3,799,837 | 3/1974 | Witnes et al. | 156/210 |
| 3,864,185 | 2/1975 | Johnson et al. | 156/210 |

FOREIGN PATENT DOCUMENTS 7,019,600  4/1970  Japan ................................. 260/17.4

*Primary Examiner*—Edward M. Woodberry

[57] ABSTRACT

Improved polyvinyl alcohol modified starch-based corrugating adhesive is provided by employing a fine particle size, low cold water solubles containing polyvinyl alcohol that is soluble in warm water, in combination with borax, alkali and water. Corrugated board with lower adhesive add-on and higher line speeds can be produced by the use of the improved polyvinyl alcohol modified starch adhesive. The resulting board has decreased warpage as a result of the lower add-on.

6 Claims, No Drawings

PROCESS OF PREPARING CORRUGATED PAPER BOARD WITH A PARTICULAR POLYVINYL ALCOHOL MODIFIED STARCH-BASED CORRUGATING ADHESIVE

BACKGROUND OF THE INVENTION

1. Field of the Invention

This invention relates to improved adhesives and more particularly it relates to an improved starchbased borated corrugating adhesive modified with polyvinyl alcohol.

2. Description of the Prior Art

U.S. Pat. No. 2,102,937 discloses an adhesive composition comprising gelatinized starch, ungelatinized starch, an alkali, and borax in water. This mixture produced a level of adhesivity in the manufacture of corrugated paper board to form satisfactory bonds between the paper surfaces. The distinguishing feature of this invention was the use of ungelatinized starch. Under use conditions, the ungelatinized starch rapidly gelatinized under the heat and pressure at the point of formation of the corrugated board structure. The gelatinization resulted in a rapid increase in viscosity, and adhesivity of the adhesive composition. Borax was used in the composition to increase the level of viscosity during this final gelatinization step. This process revolutionized the corrugating industry. The basic process described in this patent and its companion case referred to below is still essentially the only process used to manufacture corrugated paper board to this date.

A companion case of the above, U.S. Pat. No. 2,051,025, is directed to a process for the production of corrugated boards employing the adhesive of U.S. Pat. No. 2,102,937.

U.S. Pat. No. 3,498,869 discloses a corrugated board adhesive consisting of an aqueous suspension of finely divided solid polyvinyl alcohol which is substantially insoluble in water at up to about 45° C. and is readily soluble above about 80° C. (i.e., at least 70 percent by weight of the polyvinyl alcohol will remain as unswollen solid at temperatures up to about 45° C. and at least 80 percent by weight of the polyvinyl alcohol will quickly swell or dissolve in water at temperatures above about 80° C.); various modifiers such as water soluble resins (for example, soluble starch, dextrin, sodium carboxymethyl cellulose, methoxycellulose, polyvinyl alcohol, their water soluble derivatives, etc.), or water soluble salts (for example, sodium sulfate, ammonium sulfate, sodium chloride, ammonium chloride, potassium chloride, calcium chloride or sodium acetate); extenders such as clay, kaolin, bentonite, silica, diatomaceous earth, calcium carbonate, alumina, starch, etc.; a gelling agent such as boric acid, borate, etc.; and, optionally, surface active agents and if wet adhesive strength is desired to be improved aminoplasts. Specific compositions disclosed comprise about 31 to 50 percent by weight of dry materials (i.e., excluding the water) of polyvinyl alcohol, about 44 to 56 percent clay, and from 0 to about 23 percent starch.

SUMMARY OF THE INVENTION

According to the present invention there is provided an improved composition comprising at least 15%, based upon the weight of the total solids on a dry basis, of a potentially adhesive ungelatinized starch and up to 85%, based upon the weight of the total solids on a dry basis of a viscous gelatinized starch carrier therefor, the improvement consisting of employing in said composition from about 2 to about 20 percent by weight, of the total starch present, of polyvinyl alcohol having a degree of hydrolysis of from about 99 to about 100%, a 4% aqueous solution viscosity at 20° C. of from about 5 to about 60 centipoises, less than about 3 percent by weight cold water solubles at 30° C., at least about 80 percent by weight hot water solubles at 70° C., at least about 95 percent of said polyvinyl alcohol having a particle size less than about 45 microns and substantially all of said polyvinyl alcohol having a particle size less than about 75 microns.

DETAILED DESCRIPTION OF THE INVENTION

It has been discovered that fine particle size, fully hydrolyzed, medium molecular weight polyvinyl alcohol (PVA) that is substantially insoluble in water and unaffected by borax at 30° C. but readily soluble at temperatures in the range of about 70° to 85° C. is suitable in an aqueous slurry form in borated starch compositions as an adhesive for corrugated board. Surprisingly, it was found that the addition of a relatively small amount (2–20% based on the total starch) of this special PVA to conventional commercial corrugating adhesives permits a significant reduction in total adhesive consumed. Reduction in adhesive add-on of about 25–30% for domestic board and up to 50% for water resistant board has several benefits including faster line speed, lower energy required to dry the adhesive board, reduced warpage and overall lower cost of manufacture. Prior to this discovery people have tried for decades to use polyvinyl alcohol with starch adhesive and these efforts have always failed. Polyvinyl alcohol could not be used for such applications because of the reaction of borax and soluble polyvinyl alcohol fractions forming a gel. The present invention represents for the first time that a polyvinyl alcohol modifier for starch has been provided that will function satisfactorily on commercial corrugated board. The combination of the above referred to polyvinyl alcohol with commercial starch-based borated corrugating adhesives affords an adhesive system suitable for producing both domestic and water resistant corrugated boards.

The polyvinyl alcohol, to be useful according to the present invention for making corrugated board using borated starch slurry, must be borax tolerant until applied to the fluted medium and then dissolve at the temperatures encountered on the rolls, usually about 70°–85° C., even at 600 ft./min. running speeds, to give acceptable bond. Most commercial grades of polyvinyl alcohol contain more or less of a polymer fraction which is soluble in cold water (30° C.). This small amount of polyvinyl alcohol which dissolves, normally around 10 percent unless treated to improve slurry properties, is more than sufficient to react with the borax present to form gels. We found that polyvinyl alcohol with cold water solubles in the range of 1–2 percent was tolerant to as much as 2 percent borax when slurried at room temperature. The second requirement of having the polyvinyl alcohol dissolve rapidly and almost quantitatively at 70°–85° C. is more difficult to meet. The temperature of dissolution of polyvinyl alcohol depends primarily on the degree of polymerization as well as the degree of hydrolysis. The higher the molecular weight, the higher the temperature required at any given degree of hydrolysis. The higher the degree of hydrolysis, the higher the temperature required for dissolution. The rate of solution depends primarily on the particle size, the smaller the particle size, the faster the polyvinyl alcohol will dissolve.

The polyvinyl alcohols suitable in the present invention have a degree of hydrolysis of about 99 to 100 percent, have a 4 percent aqueous solution viscosity at 20° C. of about 5 to about 60 centipoises, preferably about 10 to about 15 centipoises. The polyvinyl alcohols are fine particle size, at least about 95 percent of the particles being finer than 325 mesh (45 microns) and substantially all of the particles are finer than 200 mesh (75 microns).

The polyvinyl alcohols should contain less than about 3 percent cold water solubles (at 30° C.), preferably less than about 1 percent. In other words, at least 97%, preferably 99%, of the polyvinyl alcohol will remain as unswollen solid at 30° C. Cold water solubles are determined by the following laboratory test: gently agitate 3-5% PVA in water for 15 minutes at 30° C., filter, dry filter cake and calculate the amount of recovered PVA.

On the other hand, the polyvinyl alcohol should be readily soluble at higher temperatures, i.e., at least about 80 percent of the polyvinyl alcohol should be soluble at 70° C. These solubility characteristics are critical to obtain the advantages of the present invention. Polyvinyl alcohol having these characteristics can be prepared by the heat-solvent treatment of Bristol U.S. Pat. No. 3,654,247. Briefly stated, this treatment involves heating the dispersion of the polyvinyl alcohol at a temperature of 70° to 190° C. in a liquid solvent comprising 30 to 100 percent methanol, 0 to 30 percent water, and 0 to 45 percent of a 2 to 5 carbon monohydric alcohol, methyl acetate, acetone, ethylene glycol dimethyl ether, toluene, methylene chloride, or the like.

The amount of polyvinyl alcohol can be varied from about 2 to about 20 percent by weight of the total starch present, preferably it is from about 5 to about 10 percent.

The present invention consists of improved corrugated board adhesives obtained by adding a relatively small amount of a special PVA to conventional commercial starch based corrugating adhesives. These starch based adhesives are described in U.S. Pat. No. 2,102,937 and U.S. Pat. No. 2,051,025, the disclosure of which patents are hereby incorporated by reference. Thus, briefly stated, in addition to polyvinyl alcohol the ingredients of the adhesive composition of the present invention employed for the manufacture of domestic board are starch, caustic, borax and water. The starch used can be derived from corn wet milling. The starch is unmodified and is commonly referred to as "pearl" starch or "corrugating" starch. The starch generally ranges from about 12-25% of the adhesive composition. Caustic soda is used to gelatinize starch in the primary (or carrier) portion in adhesive preparation. Soda ash-calcium hydrate mixture or sodium hydroxide is commonly used for this gelatinization step The caustic portion of the adhesive can range from about 1-5% of the primary portion depending on the degree of gelatinization desired. Borax (sodium borate) is added in the secondary or potentially adhesive base portion at about 0.25% of the total adhesive composition. The remainder of the adhesive composition is made up of water.

Adhesives suitable for the preparation of water resistant boards can also be formulated according to the present invention. They are similar to the formulations described above with the exception that they also contain some crosslinking agent such as urea/formaldehyde, ketone/formaldehyde, melamine/formaldehyde or resorcinol/formaldehyde resins which provide moisture and/or water resistance in the resultant board. The polyvinyl alcohol should be present from about 2 to about 20 percent, based on the total weight of the starch, and the crosslinking agent is present in about 2-20% by weight, preferably about 3 to 7% by weight, of the total starch content.

The following examples are given for the purpose of illustrating the invention. All parts and percentages are by weight unless otherwise specified.

EXAMPLE 1

Polyvinyl alcohol having a degree of hydrolysis of at least about 99%, a fine particle size (at least about 95% less than 45 microns, substantially all less than 75 microns), and a 4% aqueous solution viscosity at 20° C. of 12-14 centipoises, was dispersed in methanol and heated for 15 minutes at 110° C. in an autoclave to reduce the cold water soluble content to a maximum of 2%. This heat treated material was then used to modify commercial starch based corrugating adhesives using a typical agitated kettle as follows:

| Primary (or Carrier) Portion | | Single Facer | Double Backer |
|---|---|---|---|
| (1) | Add H$_2$O | 100 gal. | 100 gal. |
| (2) | Add starch | 200 lb. | 175 lb. |
| (3) | Heat to 140° F. - starch will thicken | | |
| (4) | Add flake caustic | 28 lb. | 40 lb. |
| (5) | Heat to 165° F. - hold for 15 minutes | | |
| (6) | Add dilution and cooling water - mix 10 minutes | 80 gal. | 80 gal. |
| Secondary (or Potentially Adhesive Base) Portion | | | |
| (1) | Add water | 580 gal. | 580 gal. |
| (2) | Add borax | 19 lb. | 34 lb. |
| (3) | Add starch | 900 lb. | 1225 lb. |
| (4) | Add polyvinyl alcohol | 55 lb. | 70 lb. |
| Finish | | | |
| (1) | Add primary portion to secondary portion (starch/PVA) slowly with good agitation. Pump to storage tanks. | | |

The adhesive formulations produced had the following characteristics:

| | Single Facer | Double Backer |
|---|---|---|
| Solids | 19% | 23% |
| PVA/Starch Ratio | 5/100 | 5/100 |

The above formulations were applied in standard corrugating board machines for preparing corrugated board using various weight liners and mediums.

The results of the various runs carried out with the above formulations are summarized in Table I. Commercially acceptable board was produced at 400-450 ft./min. using the PVA modified formula at add-ons which were 10-15% lower than when the unmodified starch control was used. For example, in the case of 42-26-42 corrugated board, the average add-on using starch alone was 1.75 lb./M ft.$^2$ as compared with 1.45 lbs./M ft.$^2$ for the PVA/starch modification. In the case of heavier weight boards, increased machine speeds were realized using the PVA/starch formulation compared to the speeds of 300-400 ft./min. which were typical when the regular starch only formulation was used.

TABLE I

| Grade of Paper[1] | Speeds Ft./Min. | Adhesive Consumption Dry Lb./MSF [4] | | Dry Pin Adhesion Lb./Min. [2] | |
|---|---|---|---|---|---|
| | | Single Facer | Double Backer | S.F. | D.B. |
| 26-26-26[3] | 400 | 0.50 | 1.24 | 33 | 44 |
| 26-26-26 | 400 | 0.43 | 1.01 | 36 | 49 |
| 26-26-26 | 450 | 0.92 | 0.95 | 41 | 51 |
| 42-26-42 | 400 | 0.43 | 0.97 | 31 | 57 |
| 42-26-42 | 420 | 0.68 | 0.85 | 49 | 48 |
| 42-26-42 | 475 | 0.65 | 0.85 | 55 | 52 |
| 69-26-69 | 350 | 0.71 | 1.20 | 67 | 69 |
| 69-26-69 | 400 | 0.71 | 1.26 | 63 | 69 |
| 69-26-69 | 450 | 0.71 | 1.28 | 62 | 66 |
| 69-26-69 | 520 | 0.83 | 1.30 | 68 | 68 |
| 90-26-90 | 350 | 0.65 | 1.32 | 50 | 70 |
| 90-26-90 | 450 | 0.76 | 1.32 | 56 | 79 |

[1]These figures represent, in lbs./MSF, the basis weight of the liner-corrugating medium-liner, respectively.
[2]Determined by TAPPI RC-269 "Pin Test of Board Quality of Corrugated Board".
[3]The adhesive used in this control sample was the basic starch adhesive containing no PVA.
[4]Determined by direct volumetric measurement from a small tank and noted against the amount of board produced per given time period. Knowing the density of the adhesive the volume was converted to weight.

EXAMPLE 2

Duplicate formulations as described in Example 1 were prepared and used to produce corrugated board at different speeds. Table II summarizes these runs and the data collected.

TABLE II

| Grade of Paper | Speeds Ft./Min. | Adhesive Consumption Dry Lb./MSF | | Dry Pin Adhesion Lb./Min. | |
|---|---|---|---|---|---|
| | | Single Facer | Double Backer | S.F. | D.B. |
| 42-26-42 | 380 | 0.77 | 0.78 | 47 | 52 |
| 42-26-42 | 450 | 0.68 | 0.73 | 38 | 43 |
| 42-26-42 | 500 | 0.73 | 0.86 | 46 | 49 |
| 69-26-69 | 300 | 0.83 | 1.15 | 59 | 52 |
| 69-26-69 | 360 | 0.90 | 1.05 | 55 | 65 |
| 69-26-69 | 400 | 0.84 | 1.09 | 47 | 61 |
| 69-26-69 | 450 | 0.77 | — | 47 | 53 |
| 69-26-69 | 560 | 0.81 | 1.10 | 42 | 54 |
| 90-26-90 | 275 | 0.67 | 1.25 | 38 | 51 |
| 90-26-90 | 375 | 0.64 | 1.25 | 38 | 55 |
| 90-26-90 | 375 | 1.05 | 1.25 | 55 | 54 |

EXAMPLE 3

This example illustrates the use of a starch/polyvinyl alcohol/resin formulation in producing water resistant corrugated board. The formulation was prepared as follows:

Primary (or Carrier) Portion (1) Add water — 1210 lbs.
(2) Add starch — 200 lbs.
(3) Heat to 140° F. — 10 minutes
(4) Add flake caustic — 28 lbs.
(5) Heat to 165° F. — hold for 15 minutes
(6) Allow to cool to 100° F. before dropping.

Secondary (or Potentially Adhesive Base) Portion (1) Add water — 3920 lbs.
(2) Add borax — 19 lbs.
(3) Add starch — 900 lbs.
(4) Add polyvinyl alcohol — 55 lbs.

Finish (1) Drop primary tank contents to secondary tank with good agitation
(2) After addition complete — agitate 15 minutes
(3) Add 55 lbs. "Amres 7600" acetone formaldehyde resin available from Pacific Resins and Chemicals
(4) Agitate 30 minutes The above formulation was used to produce water resistant board with various amounts of adhesive applied at the single facer. The results of the various runs are summarized in Table III. Using the prior art commercial starch/resin formulations add-ons in the range of 3.5–4.5 lbs./MSF (of starch and resin) are required to give corrugated board with good water resistance, i.e., board that passes the ASTM D1028-59 water resistance test.

TABLE III

WATER-RESISTANT BOARD

| Adhesive | Grade of Paper | Speed Ft./Min. | Adhes. Cons. Dry Lb./MSF | | Dry Pin Adhesion Lb./Min. | | Wet Pin Adhesion[1] | | 24 Hr. Soak[2] | |
|---|---|---|---|---|---|---|---|---|---|---|
| | | | SF | DF | SF | DF | SF | DF | SF | DF |
| Starch/PVA/Resin | 69/26/69 | 350 | 1.0 | 1.04 | 75 | 67 | 7.2 | 5.8 | P | P |
| | 69/26/69 | 350 | 1.33 | 1.18 | 75 | 70 | 5.8 | 6.3 | P | P |
| | 69/26/69 | 350 | 1.66 | 1.18 | 82 | 67 | 7.5 | 6.5 | P | P |
| | 69/26/69 | 350 | 2.00 | 1.18 | 82 | 70 | 7.8 | 6.5 | P | P |
| | 69/26/69 | 450 | 0.67 | 1.18 | 44 | 66 | 0 | 5.5 | F | P |

[1]Regular 2" × 5" sample, soaked 1 hour in 73° F. water. Tested with Owens-Illinois Sel. Side Fixture (ASTM D 1028-59)
SF - Fiber Pull at 1.33, 1.66 and 2.00 add-on, very little at 1.0, none at 0.67.
DF - Fiber Pull on all samples except 450 FPM where flutes decapped
[2]Government requirement 6" × 10" sample soaked 24 hours in 73° F. water with flutes vertical and top 1" below water line (ASTM D 1028-59)
Passes test (P) if no voluntary delamination or no more than ¼" delamination on edges when flicked with thumb
Fails test (F) if it does not meet above

I claim:

1. An improved continuous process of preparing corrugated board consisting of at least one liner and at least one fluted medium, which process includes the steps of (1) continuously applying to the tips of the corrugations of the fluted medium a composition comprising at least 15%, based upon the weight of the total solids on a dry basis, of a potentially adhesive ungelatinized starch and up to 85%, based upon the weight of the total solids on a dry basis, of a viscous gelatinized starch carrier therefor, (2) bringing a liner in contact with the adhesive coated tips of the corrugated medium; and (3) applying heat and pressure to bond said liner and fluted medium, the improvement consisting of employing in said composition from about 2 to about 20 percent, by weight of the total starch present, of polyvinyl alcohol having a degree of hydrolysis of from about 99 to about 100 percent, a 4 percent aqueous solution viscosity at 20° C. of from about 5 to about 60 centipoises, less than about 3 percent by weight cold water solubles at 30° C., at least about 80 percent by weight hot water solubles at 70° C., at least about 95 percent of said polyvinyl alcohol having a particle size less than about 45 microns and substantially all of said polyvinyl alcohol having a particle size less than about 75 microns.

2. The process of claim 1 wherein said polyvinyl alcohol has a 4 percent aqueous solution viscosity at 20° C. of from about 10 to about 15 centipoises and contains less than about 1 percent by weight cold water solubles.

3. The process of claim 2 wherein said polyvinyl alcohol is present in an amount of from about 5 to about 10 percent by weight of the total starch present.

4. The process of claim 1 containing from about 2 to about 20 percent by weight of crosslinking agent.

5. The process of claim 4 wherein said crosslinking agent is selected from the group consisting of urea/formaldehyde resins, ketone/formaldehyde resins, melamine/formaldehyde resins and resorcinol/formaldehyde resins.

6. The process of claim 5 wherein said crosslinking resin is an acetone/formaldehyde resin and said resin is present in an amount of from about 3 to about 7 percent by weight of the total starch present.

* * * * *